US008953083B2

(12) United States Patent
Hegde

(10) Patent No.: US 8,953,083 B2
(45) Date of Patent: Feb. 10, 2015

(54) HOUSING CAMERA LENS COVER USING GRIN TECHNOLOGY

(75) Inventor: Shashikant G. Hegde, San Jose, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 13/372,420

(22) Filed: Feb. 13, 2012

(65) Prior Publication Data

US 2013/0208169 A1    Aug. 15, 2013

(51) Int. Cl.
*G02B 13/16*    (2006.01)

(52) U.S. Cl.
USPC .......................................... 348/335; 348/373

(58) Field of Classification Search
CPC . H04N 5/2254; H04N 5/23212; H04N 5/232; H04N 5/2253; G02B 7/102
USPC ............... 348/335; 359/776; 29/428
See application file for complete search history.

(56) References Cited

U.S. PATENT DOCUMENTS

| 7,009,652 | B1 | 3/2006 | Tanida et al. | |
| 7,667,286 | B2 | 2/2010 | Toshikiyo et al. | |
| 7,683,961 | B2 | 3/2010 | Hartlove et al. | |
| 7,764,193 | B2 * | 7/2010 | Chen | 340/907 |
| 8,303,196 | B2 * | 11/2012 | Aizawa et al. | 396/529 |
| 8,559,806 | B2 * | 10/2013 | Seo | 396/133 |
| 2001/0033338 | A1 * | 10/2001 | Hunter | 348/335 |
| 2008/0062422 | A1 * | 3/2008 | Thomas et al. | 356/432 |
| 2008/0185672 | A1 * | 8/2008 | Jacobsen et al. | 257/432 |
| 2009/0323206 | A1 * | 12/2009 | Oliver et al. | 359/776 |
| 2010/0157436 | A1 * | 6/2010 | Ichinose et al. | 359/652 |
| 2011/0058255 | A1 * | 3/2011 | Weiss | 359/511 |
| 2011/0115965 | A1 | 5/2011 | Engelhardt et al. | |
| 2012/0002919 | A1 * | 1/2012 | Liu | 385/27 |
| 2013/0039619 | A1 * | 2/2013 | Laughlin | 385/33 |

* cited by examiner

*Primary Examiner* — Twyler Haskins
*Assistant Examiner* — Fayez Bhuiyan
(74) *Attorney, Agent, or Firm* — Blakely, Sokoloff, Taylor & Zafman LLP

(57) ABSTRACT

A mobile device having an external housing that includes a housing camera lens cover made of graded index (GRIN) material is described herein. The housing camera lens cover has one face that faces a camera lens of a camera module included in the mobile device and another face that is exposed to the exterior of the mobile device. By using the GRIN material in the housing camera lens cover, the light rays are bent by the GRIN material before the light rays reach the camera lens. This bending of the light rays reduces the optical total track length (TTL) of the camera module and also reduces high Chief Ray Angle (CRA) such that the z-height of the camera module may be reduced while maintaining the camera's imaging performance.

20 Claims, 5 Drawing Sheets

HOUSING CAMERA LENS COVER USING GRIN TECHNOLOGY

FIELD

An embodiment of the invention relate generally to a housing camera lens cover using graded index (GRIN) technology to reduce the optical total track length (TTL) and the high chief ray angles (CRA).

BACKGROUND

Currently, a wide range of portable consumer electronics that are not dedicated to photographic uses are equipped with cameras. These portable consumer electronics may include, for example, smart phones, laptops, notebooks, tablet computers, and personal digital media players. These portable consumer electronics are often constrained in both x-y area and z-height or thickness such that the camera included therein must be designed to meet the sizing constraints while providing adequate camera quality.

The optical total track length (TTL) is one of the most important factors determining the z-height of a camera included in portable consumer electronics. Since the optical TTL dictates the distance between the camera lens and the image sensor, in order to properly integrate the camera into a thin portable consumer electronics device, it is necessary to reduce the TTL without affecting the imaging performance of the camera.

Another important factor in determining the z-height of a camera is the Chief Ray Angles (CRA). The CRA is the angle measured from the vertical axis drawn through the center of the lens (i.e., the normal) to the meridional ray that starts at the edge of the object that is being captured in photo and passes through the center of the lens. Many sensors are sensitive to high CRAs (e.g., greater than 20 degrees) such that it is necessary to reduce the high CRAs at larger field heights in order to improve the overall imaging performance of the camera.

SUMMARY

In one embodiment of the invention, a consumer electronics device comprises an external housing and a camera module including a camera lens and an image sensor. The external housing includes a housing camera lens cover that is made of graded index (GRIN) material. The housing camera lens cover has one face that faces the camera lens and another face that is exposed to the exterior of the device. By using the GRIN material in the housing camera lens cover, the light rays are bent by the GRIN material before the light rays reach the camera lens. This bending of the light rays reduces the optical total track length (TTL) of the camera module and also reduces high Chief Ray Angle (CRA) such that the z-height of the camera module may be reduced while maintaining the camera's imaging performance.

In one embodiment of the invention, the external housing of the consumer electronics device has installed therein a plurality of electronic components of the device (e.g, a processor, data storage including an operating system and application software, a display panel). The external housing may also include a ring around the housing camera lens cover that is made of anti-reflective material.

Another embodiment is a method of manufacturing, where an external housing of a device that includes a housing camera lens cover made of GRIN material is produced. A camera module that includes a camera lens and an image sensor is then enclosed in the external housing. Enclosing the camera includes placing a first face of the housing camera lens cover at a location that faces the camera lens. A second face of the housing camera lens is exposed to the exterior of the device.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
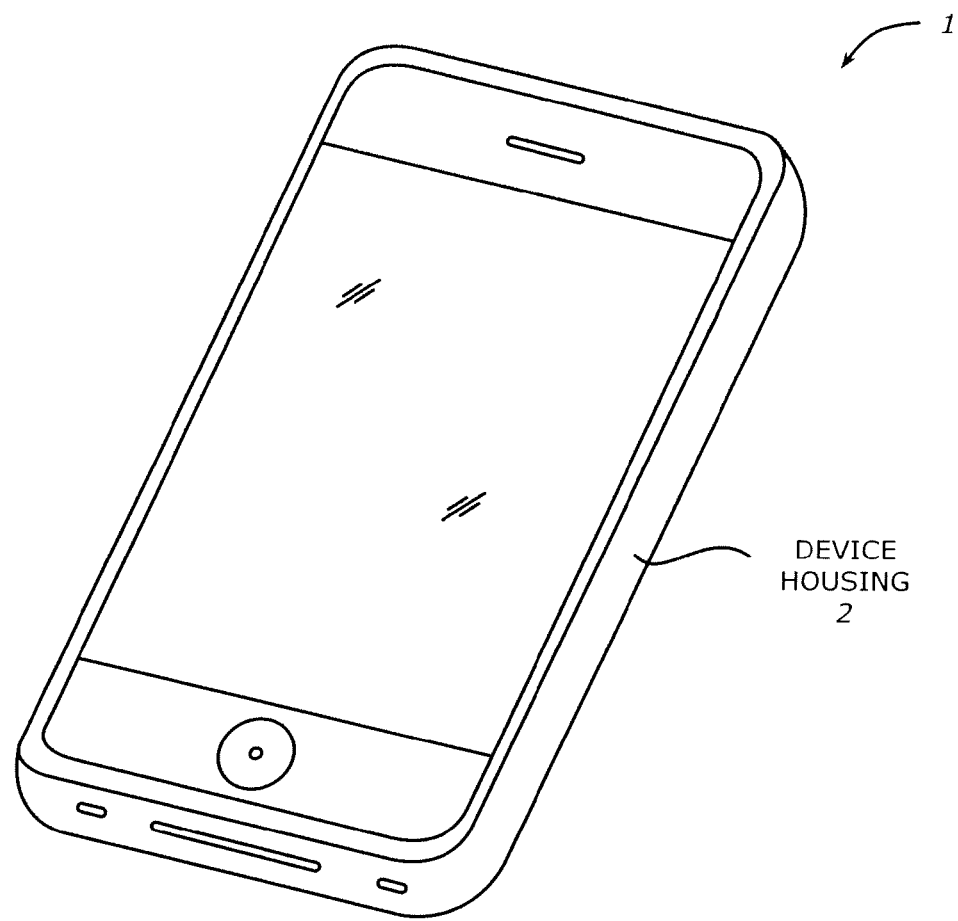
FIG. 1 illustrates one example of a portable consumer electronic device that is constrained in size and thickness in which an embodiment of the invention may be implemented.

FIG. 1 illustrates one instance of a portable consumer electronic device (or "mobile device") that is constrained in size and thickness in which an embodiment of the invention may be implemented. As shown in FIG. 1, the mobile device 1 may be a mobile telephone communications device or a smartphone such as an iPhone™ device, from Apple Inc. of Cupertino, Calif. The mobile device 1 may also be a tablet computer such as an iPad™ device, a personal digital media player such an iPod™ device or a notebook computer such as a MacBook Air™ device, which are all from Apple Inc. of Cupertino, Calif. The device housing 2 (also referred to as the external housing) encloses a plurality of electronic components of the device 1. For example, the device 1 may include electronic components such as a processor, a data storage containing an operating system and application software for execution by the processor, and input-output devices such as a display screen and a camera module. The camera module includes a camera lens and camera circuitry including, for instance, an image sensor to capture digital images. While FIG. 1 illustrates a mobile device 1, it is understood that embodiments of the invention may also be implemented in a non-mobile device such as a compact desktop computer such as an iMac™, from Apple Inc. of Cupertino, Calif.

Figure 2:
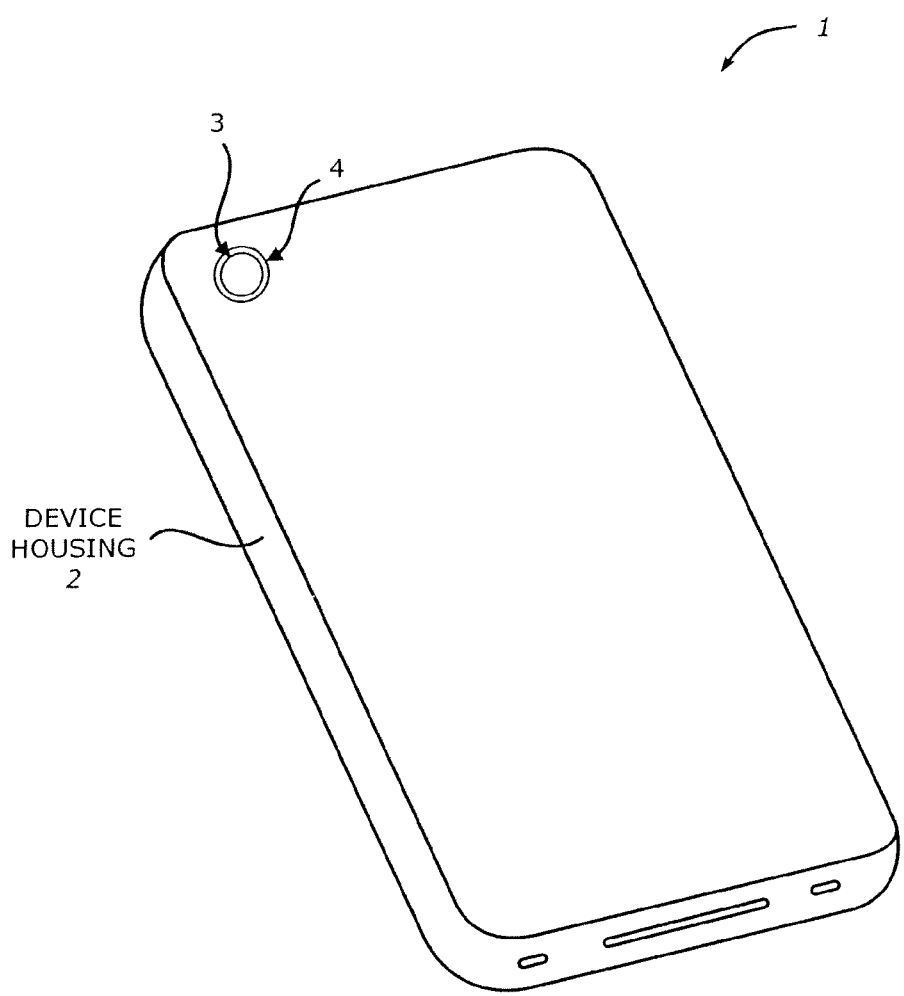
FIG. 2 shows a backside view of a portable consumer electronic device in which an embodiment of the invention may be implemented.

FIG. 2 shows a backside view of the portable consumer electronic device in which an embodiment of the invention may be implemented. In FIG. 2, the backside view of the mobile device 1 shows the external housing 2 including a housing camera lens cover 3 and a ring 4 which is located around the housing lens cover 3. The ring 4 may be made of antireflective material and the housing camera lens cover 3 may be made of a graded index (GRIN) material. For instance, GRIN wafers may be used as the housing camera lens cover 3 such that the GRIN material is in the form of an array throughout the wafer. The GRIN material may be glass, plastic or other materials. To prevent the housing camera lens cover 3 to be scratched, housing camera lens cover 3 is flat and the face of the housing camera lens cover 3 that is exposed to the exterior of the mobile device 1 is flush with the exterior housing 2.

Figure 3:
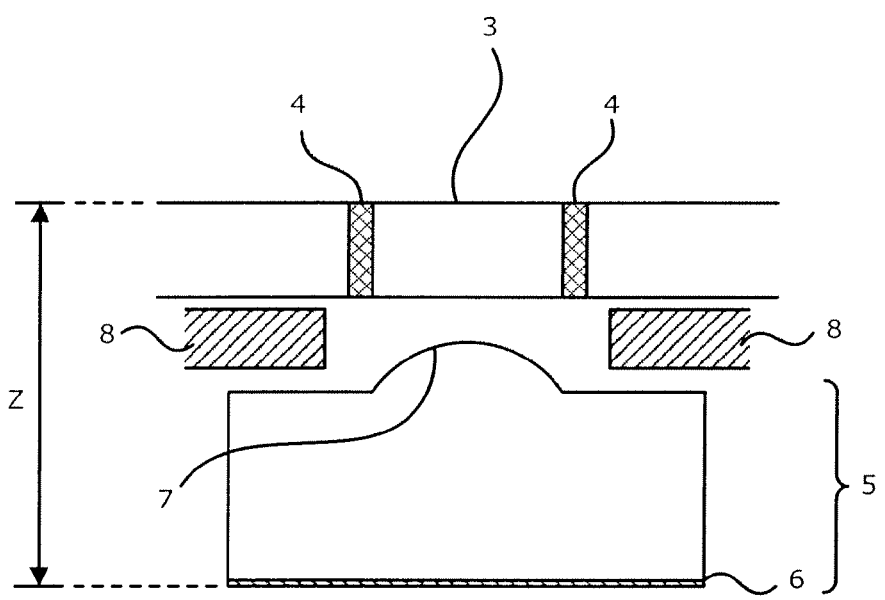
FIG. 3 shows a cross-section view of the portable consumer electronic device in which an embodiment of the invention may be implemented.

FIG. 3 shows a cross-section view of the portable consumer electronic device in which an embodiment of the invention may be implemented. As illustrated in FIG. 3, a camera module 5 is enclosed in the external housing 2 of the mobile device 1. The camera module 5, which includes a camera lens 7 and an image sensor 6 to capture images, is located to face the housing camera lens cover 3. With this configuration, the camera lens 7 is protected from being damaged by the housing camera lens cover 3 and the camera module 5 is also able to capture images as seen through the housing camera lens cover 3. In some embodiments, a material such as foam 8 may be placed between the external housing 2 and the camera module 5 to further protect the camera module 5 from damage that may occur when, for instance, the mobile device 1 is dropped by the user.

Figure 4B:
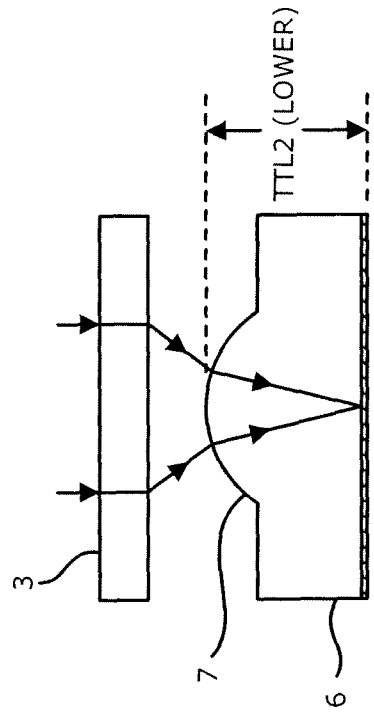
FIG. 4B shows a camera module and a housing camera lens cover according to an embodiment of the invention.
Figure 4A:
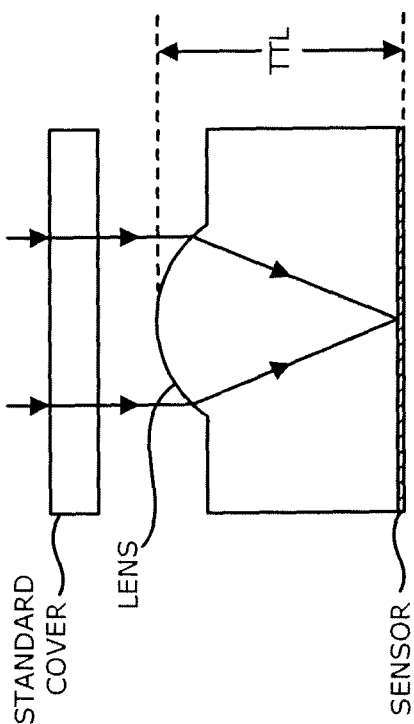
FIG. 4A shows a conventional camera module and a conventional housing camera lens cover.

As illustrated in FIG. 4A, the standard housing camera lens cover does not bend the incident light rays such that the bending of the light rays is entirely done by the camera lens in the camera module. In contrast, as shown in FIG. 4B, by using GRIN material in the housing camera lens cover 3, the housing camera lens cover 3 is used as an active element of the camera's optical system. GRIN material has a gradual distribution of the refractive index inside the material. Accordingly, once the incident light rays reach the housing camera lens cover 3 made of GRIN material, the GRIN material bends the incident light rays as the light rays pass through the GRIN material. The angle between the incident light ray and the normal to the GRIN material (i.e., angle of incidence) is greater than the angle between the refracted light ray that is transmitted through the GRIN material and the normal to the GRIN material (i.e., angle of refraction). This bending of the light rays by the housing camera lens cover 3 helps reduce the optical TTL without affecting the imaging performance of the camera module 5 and also helps reduce the high CRAs that are seen in compact camera modules which further improves the overall imaging performance of the camera module 5. Further, the amplitude and gradient profile of the refractive index may be engineered to match the optimal optical design and thus, the specific thickness of the housing camera lens cover 3 may be determined.

The thickness of mobile devices 1 having thin profiles is often constrained by the height of the camera module 5. Accordingly, by reducing the optical TTL and the high CRA, the necessary z-height of the camera module 5 may be reduced, as shown in FIG. 4B and thus, the camera module 5 may be implemented in mobile devices 1 that are constrained in thickness.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
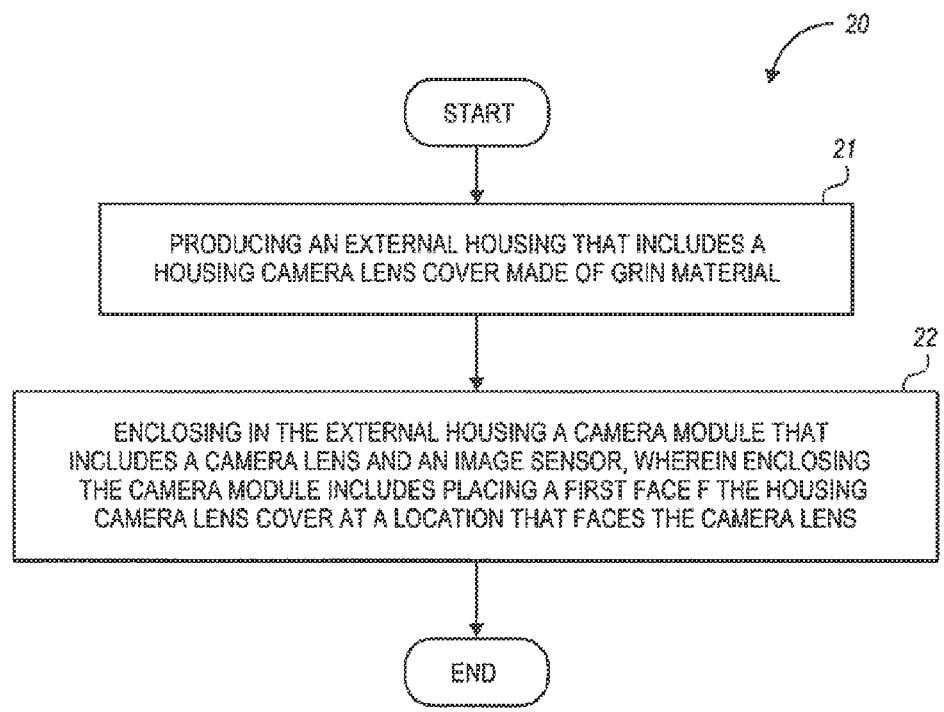
FIG. 5 shows an example method of manufacturing the mobile device that includes camera module and a housing camera lens cover according to an embodiment of the invention.

FIG. 5 shows a flow diagram of an example method of manufacturing the mobile device that includes camera module and a housing camera lens cover according to an embodiment of the invention. Method 20 begins with producing an external housing of a mobile device (Block 21). This external housing includes a housing camera lens cover made of GRIN material and includes a face that is exposed to the exterior of the mobile device. At Block 22, a camera module that includes a camera lens and an image sensor is enclosed in the external housing. Enclosing the camera module also includes placing the other face of the housing camera lens cover at a location that faces the camera lens. In this configuration, the housing camera lens cover made of GRIN material may bend the incident light rays to create an angle of refraction is smaller than the angle of incidence. Accordingly, this additional bending of the light rays by the housing camera lens cover 3 helps reduce the optical TTL as well as the high CRAs.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A consumer electronics device comprising:
   an external housing in which a plurality of electronic components of the device, including a processor, data storage containing an operating system and application software for execution by the processor, and a display panel, are installed, the external housing including a housing camera lens cover being made of graded index (GRIN) material, the housing camera lens cover having a first face and a second face, the second face being exposed to an exterior of the device; and
   a camera module including a camera lens and an image sensor, the camera lens facing the first face of the housing camera lens cover,
   wherein the housing camera lens cover bends light rays before the light rays reach the camera lens, wherein the housing camera lens cover is separate from the camera lens,
   wherein the GRIN material in the housing camera lens cover reduces the optical total track length of the camera module.

2. The device of claim 1, wherein the housing camera lens cover is a wafer, wherein the GRIN material is in a form of an array throughout the wafer.

3. The device of claim 1, the housing camera lens cover is flat.

4. The device of claim 1, wherein the second face is flush with the external housing.

5. The device of claim 1, wherein the external housing further includes a ring around the housing camera lens cover, the ring being made of anti-reflective material.

6. The device of claim 1, wherein an amplitude and gradient profile of a refractive index of the GRIN material are selected to bend of the light rays, to reduce the optical total track length of the camera module and to reduce high Chief Ray Angles (CRAs).

7. The device of claim 1, wherein the device being a thin profile device.

8. The device of claim 7, wherein the device is one of a mobile telephone communications device, a smart phone, a personal digital media player, a tablet computer, a notebook computer, and a compact desktop.

9. A device comprising:
   an external housing including a housing camera lens cover being made of graded index (GRIN) material, the housing camera lens cover having a first face and a second face, the second face being exposed to an exterior of the device;
   a camera module including a camera lens and an image sensor, the camera lens facing the first face of the housing camera lens cover, wherein the housing camera lens cover is separate from the camera lens, wherein the GRIN material in the housing camera lens cover reduces the optical total track length of the camera module.

10. The device of claim 9, wherein the housing camera lens cover is a wafer, wherein the GRIN material is in a form of an array throughout the wafer.

11. The device of claim 9, wherein the external housing includes a ring around the housing camera lens cover, the ring being made of antireflective material.

12. The device of claim 9, wherein the housing camera lens cover is flat.

13. The device of claim 12, wherein the second face is flush with the external housing.

14. The device of claim 9, wherein the housing camera lens cover bends light rays before the light rays reach the camera lens.

15. The device of claim 9, wherein the GRIN material has an amplitude and gradient profile of a refractive index that are selected to bend of the light rays, to reduce the optical total track length of the camera module and to reduce high Chief Ray Angles (CRAs).

16. The device of claim 9, wherein the device being a thin profile device.

17. The device of claim 16, wherein the device is one of: a mobile telephone communications device, a smart phone, a personal digital media player, a tablet computer, a notebook computer, and a compact desktop.

18. A method comprising:
   producing an external housing of a device that includes a housing camera lens cover made of graded index (GRIN) material, the housing camera lens cover including a first face and a second face, the second face being exposed to an exterior of the device; and
   enclosing a camera module in the external housing, the camera module including a camera lens and an image sensor, wherein enclosing the camera module in the external housing includes placing the first face of the housing camera lens cover at a location that faces the camera lens, wherein the housing camera lens cover is separate from the camera lens, wherein the GRIN material in the housing camera lens cover reduces the optical total track length of the camera module.

19. The method of claim 18, wherein the housing camera lens cover bends light rays before the light rays reach the camera lens.

20. The method of claim 18, wherein the GRIN material has an amplitude and gradient profile of a refractive index that are selected to bend of the light rays, to reduce the optical total track length of the camera module and to reduce high Chief Ray Angles (CRAs).

* * * * *